C. R. POWERS.
COMPRESSION GREASE CUP.
APPLICATION FILED FEB. 19, 1912.
1,061,323.
Patented May 13, 1913.
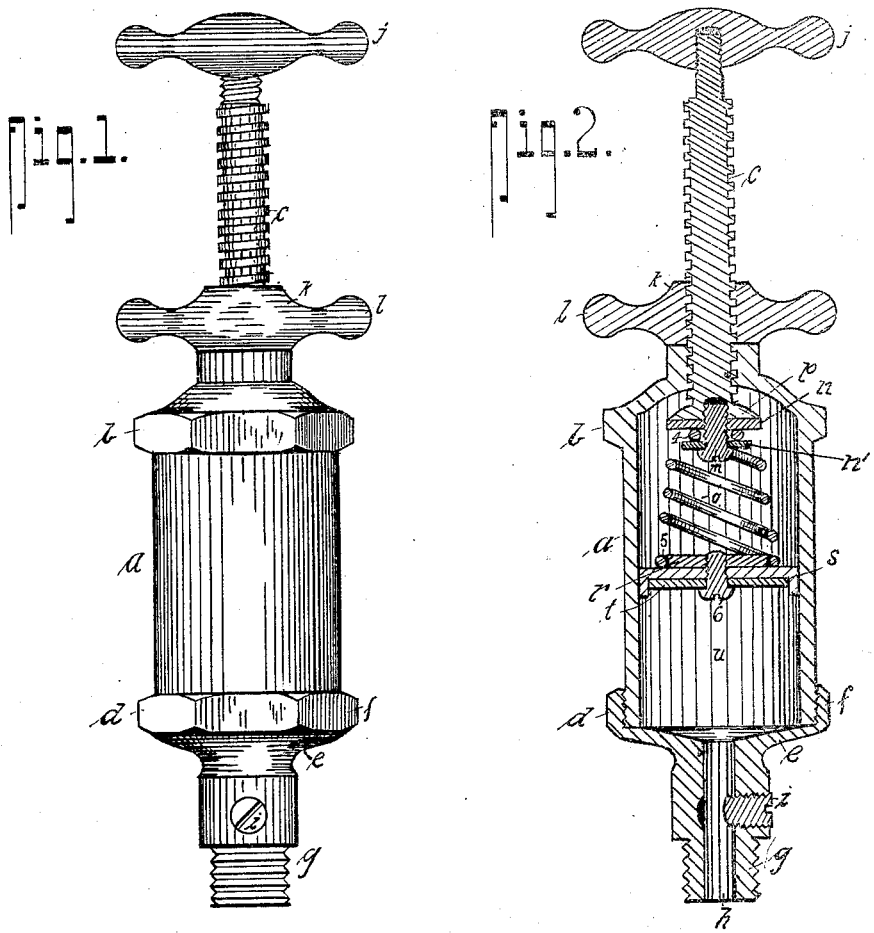
WITNESSES:
Sydney B. Davis
Geo. M. Davis
Clarence R. Powers,
INVENTOR.

UNITED STATES PATENT OFFICE.

CLARENCE R. POWERS, OF TERRE HAUTE, INDIANA.

COMPRESSION GREASE-CUP.

1,061,323.  Specification of Letters Patent.  Patented May 13, 1913.

Application filed February 19, 1912. Serial No. 678,513.

*To all whom it may concern:*

Be it known that I, CLARENCE R. POWERS, a citizen of the United States, residing at Terre Haute, in the county of Vigo and State of Indiana, have invented a new and useful Improvement in Compression Grease-Cups, of which the following is a full specification.

My invention relates to that class of grease-cups, used to regulate and supply grease or other similar commodity, commonly called hard-lubricants, to bearings; and the objects of the invention are; first, to provide a cup whereby any of the well known hard lubricants may be uniformly and safely applied to the bearings of a machine; second, to provide such a device whereby a uniform and continuous pressure is applied to the lubricant thereby maintaining a regulated feed from the cup to the bearing, to which it is attached; third, to provide such a device which will be efficient, accurate in its feed, and convenient to fill and operate and fourth, to provide such a device, which will by reason of its peculiar structure, save time, labor and lubricant. These objects I attain by means of the mechanism illustrated in the accompanying drawings, in which:—

Figure 1, is a view of the exterior of the grease-cup. Fig. 2, is a sectional view of the grease-cup, showing the interior thereof.

Similar letters of reference refer to similar parts throughout the several views.

The letter $a$ indicates a metallic cylinder, which forms the body proper of the cup and which is closed at the upper end by means of a cap $b$, integral with the cylinder $a$. The cap $b$ is slightly bell-shaped and is perforated and internally threaded at its center, for the purpose of receiving the hereinafter described shaft $c$, and said cap is internally threaded to receive the threads of the shaft $c$.

The lower edge of the cylinder $a$ is externally threaded to receive the internal threads of the hereinafter described cap $d$. The letter $d$ indicates a cap, consisting of a funnel-shaped body $e$, an octagonal flange $f$, projecting laterally from the upper edge of said funnel-shaped body $e$ and adapted to engage a wrench, and an externally threaded stem $g$, pendent from said body $e$.

The stem $g$ is perforated throughout along its axis, to provide a feed-vent $h$, which has fluid passage connection with the interior of the cylinder $a$ and with the lubricant vent of the bearing to which the cup is attached, respectively. The stem $g$ is perforated transversely through one side and said perforation is internally threaded to receive the cut-off screw $i$, which is externally threaded and adapted to thread backward and forward within the feed-vent $h$ of the stem $g$, for the purpose of regulating the flow through said feed-vent. The inner wall of the feed-vent $h$ is counter-sunk at a point opposite to the inner end of the cut-off screw $i$, wherein the extreme end of the said cut-off screw may be seated, when it is desired to entirely cut off or close said feed-vent. The letter $c$ indicates a shaft, threaded externally and adapted to engage and thread into the internal thread of the perforation in the cap $b$. A handle $j$ is attached to the extreme upper end of the shaft $c$, by means of threads upon said shaft. A jam-nut $k$, provided with laterally projecting handles $l$, is internally threaded to fit the external threads of the shaft $c$, and is adapted to seat itself upon the top of the cap $b$ and thereby set the shaft $c$ and hold the same securely in any set position.

The lower end of the shaft $c$ is perforated along its axis and said perforation is internally threaded to receive the set-screw $m$. The letter $p$ indicates an enlargement of the lower end of the shaft $c$, slightly cup-shaped to fit snugly up against the curved inner wall of the cap $b$ and which is perforated at its center to receive the set-screw $m$. The letter $n$ indicates a metallic washer, which is supported upon the set-screw $m$ and which is held against the lower face of the enlargement $p$ of the shaft $c$.

The letter $n'$ indicates a washer supported by the head of the set-screw $m$, immediately below the washer $n$.

The letter $o$ indicates a spiral spring, the extreme end coils 4 and 5, of which are flattened, to set flatly upon the washer $n'$ and the piston-leather $s$, respectively.

A flat metallic washer $r$, is grooved upon its outer edge, to receive the lower flattened coil of the spring $o$. The said lower coil 5 of the spring $o$, fits tightly into the groove upon the edge of the washer $r$ and is soldered thereto. The washer $r$ is perforated at its center and internally threaded to receive the set-screw 6. A cup-like piston leather $s$, is perforated at its center to receive the set-screw 6, upon which it is mounted, and the edge thereof is turned down to fit the inner wall of the cylinder a. A flat metallic washer t, is perforated at its center to receive the set-screw 6 and the outer edge thereof fits snugly within the piston-leather s. The washer t is held up firmly against the under side of the piston-leather s, by means of the set-screw 6. When so assembled the washers r and t, the piston-leather and set-screw 6, together form a piston member which serves to force the grease body downward, in the manner hereinafter set forth.

To fill my cup with grease or other similar lubricant, I detach the cup from the bearing to which it is attached; loosen the jam-nut k, screw the shaft and the mechanism thereto attached to the top of the cylinder a, thereby enlarging the interior of the grease-chamber u formed by the cylinder a, to its fullest capacity; the cup is then filled to its fullest capacity, compressing the spring o as much as possible, in order that all the grease possible may be placed within the cup. The cup is then replaced upon the bearing by means of the threaded stem g, and the jam-nut k is set firmly upon the top of the cap b. When so adjusted the natural expansion of the spring o will force the piston-leather s downward upon the body of grease within the cup and, incidentally, force grease outward through the feed-vent h, into the vent of the bearing.

When the spring o is fully expanded, the jam-nut k is loosened and the shaft c is screwed downward, until the spring o is again sufficiently compressed upon the body of grease, the jam-nut k is reset, when the expansion of the spring will feed the grease through the feed-vent, until the grease-chamber is empty. In this manner the feed is regulated by the use of springs of calculated strength, and the cup may be adjusted to feed slow or fast, as desired. A uniform feed is thus maintained at all times and the cup needs adjusting, only when the spring o is fully expanded or the cup empty.

Having described my invention, its structure, operation and advantages, what I claim as new and useful and desire to secure by Letters Patent is:—

1. In a grease-cup, the combination of a cylinder having its upper end closed by a cap, integral therewith and having an aperture at its center, and having its lower end threaded with a threaded cap, adapted to screw onto the externally threaded lower end of said cylinder and having a wrench flange projecting laterally from the upper edge and an externally threaded stem pendent from the center thereof, a feed-vent extending axially through said stem, a cut-off screw movably mounted in said stem and adapted to close said feed-vent, an externally threaded shaft extending outwardly from the interior of said cylinder, through the upper cap thereof and adapted to thread up and down through said upper cap, a pair of washers attached to the inner end of said shaft, means of attaching the same, a spiral-spring having its upper coil clamped between said pair of washers, a washer having a grooved edge adapted to receive and be attached to the lower coil of said spring, a piston leather and supporting washer attached to said grooved-washer, means of attaching the same, a jam-nut threaded upon said shaft and adapted to seat itself upon the upper cap and a handle attached to the outer end of said shaft, all substantially as shown and for the purpose set forth.

2. In a grease-cup, the combination of a cylinder, having its lower end screw threaded, and having the upper end closed by a cap, said cap having a threaded aperture in the center thereof, an externally threaded shaft, extending from the interior of said cylinder through said threaded aperture, a jam-nut upon said shaft, a handle upon the upper end of said shaft, a set-screw adapted to attach a pair of washers to said shaft, a pair of metallic washers supported by said set-screw, a spiral-spring having its upper coil clamped between said pair of washers, a grooved washer adapted to engage the lower coil of said spring and be fixed thereto, a piston leather and supporting washer attached to said grooved washer, said piston leather being turned downward and against the inner wall of said cylinder and adapted to push all matter therein before it, an internally threaded cap adapted to close the lower end of said cylinder and having a wrench-flange projecting radially therefrom, an externally threaded stem integral with and pendent from the body of said lower cap, a feed-vent extending through said stem, a cut-off screw adjustably mounted in the side of said stem and adapted to close said feed-vent, all substantially as shown and described and for the purpose set forth.

CLARENCE R. POWERS.

Witnesses:
SYDNEY B. DAVIS,
GEO. M. DAVIS.